United States Patent
Garg et al.

(10) Patent No.: US 10,635,843 B2
(45) Date of Patent: Apr. 28, 2020

(54) SIMULATION MODELING FRAMEWORKS FOR CONTROLLER DESIGNS

(71) Applicant: Synopsys, Inc., Mountain View, CA (US)

(72) Inventors: Amit Garg, Gurgaon (IN); Ashutosh Pandey, Noida (IN); Nitin Gupta, Noida (IN)

(73) Assignee: Synopsys, Inc., Mountain View, CA (US)

( * ) Notice: Subject to any disclaimer, the term of this patent is extended or adjusted under 35 U.S.C. 154(b) by 1036 days.

(21) Appl. No.: 14/850,751

(22) Filed: Sep. 10, 2015

(65) Prior Publication Data

US 2016/0357889 A1 Dec. 8, 2016

(30) Foreign Application Priority Data

Jun. 4, 2015 (IN) .......................... 2806/CHE/2015

(51) Int. Cl.
*G06G 7/48* (2006.01)
*G06F 30/20* (2020.01)

(52) U.S. Cl.
CPC .................................. *G06F 30/20* (2020.01)

(58) Field of Classification Search
None
See application file for complete search history.

(56) References Cited

U.S. PATENT DOCUMENTS

| 6,892,373 | B2 * | 5/2005 | Whitaker | G06F 17/5045 716/104 |
| 6,996,515 | B1 * | 2/2006 | Foltin | G06F 17/5031 703/19 |
| 7,165,229 | B1 * | 1/2007 | Gathoo | G06F 17/5022 716/105 |
| 7,788,625 | B1 * | 8/2010 | Donlin | G06F 17/5045 716/109 |
| 8,170,857 | B2 * | 5/2012 | Joshi | G11C 11/412 703/14 |
| 2007/0006108 | A1 * | 1/2007 | Bueti | G06F 17/5045 716/119 |

* cited by examiner

*Primary Examiner* — Rehana Perveen
*Assistant Examiner* — Nithya J. Moll
(74) *Attorney, Agent, or Firm* — Fenwick & West LLP (57) ABSTRACT

A method for enabling user-customization of a controller design for simulation comprises accessing at least one library of individual simulation component models for controller components. The method further comprises receiving information describing an architecture of a customized controller design corresponding to a controller that controls communications between other parts of a first target system. The method additionally comprises generating a controller simulation model for the customized controller design based on the first architectural information, the controller simulation model including instances of a plurality of the simulation component models.

19 Claims, 7 Drawing Sheets

SIMULATION MODELING FRAMEWORKS FOR CONTROLLER DESIGNS

RELATED APPLICATIONS

This application claims the benefit of Indian Patent Application No. 2806/CHE/2015 entitled "Simulation Modeling Frameworks for Controller Designs," filed on Jun. 4, 2015, the entire contents of which are incorporated herein by reference for all purposes as if fully set forth herein.

BACKGROUND

1. Field of the Disclosure

This disclosure pertains in general to computer hardware simulation modeling, and more specifically to simulation modeling frameworks for configurability of controller designs (e.g. memory controller designs) of a target system.

2. Description of the Related Art

With the advancement of computer systems and their applications, processing power and computing speed has increased substantially. At the same time, the complexity and number of components included in various computer hardware components has also increased. This increase in complexity of modern computer systems has led to new techniques for system design and modeling that enable faster, less error-prone, and more user-friendly design configurability. System designers frequently need to create and simulate computer system designs that meet the rapidly changing performance and power requirements, in a shorter time span to meet the demands of the competitive market. The reduced time to market and the increased complexity of computer system components has led to the adoption of simulation techniques that allow designers to rapidly generate models of their target computer systems and analyze the performance of these models before such models are actually implemented in silicon. The adoption of these modeling and simulation approaches and tools has spun off a field known as early stage architectural exploration that allows designers to explore a variety of system architectures before selecting a desired architecture for their system design.

But despite the benefits of model creation approaches and tools to early stage architectural exploration and efficient system design, model creation can itself be tedious and time consuming. The need for efficient and cost-effective early simulation and architectural exploration has created a corresponding need for readily configurable models for various system components so as to give users and designers the capability to modify model behavior for exploration purposes. But at the same time, model simulation for performance and power validation should be sufficiently accurate.

For complex computer system components like controllers (e.g., memory controllers) and associated parts interconnected by the controllers (e.g., on the system on chip (SoC) and system memory side), it is beneficial to enable design and development of a configurable system level model that allows a designer to characterize and validate the behavior of the controller or subcomponents thereof before implementation in silicon.

SUMMARY

According to some embodiments, a customization framework enables designers to modify and customize various aspects (structural, connectivity, functionality, and so on) of a component design in an easy and rapid fashion. Such customizability of model creation, as described herein, improves early stage architectural exploration and efficient system design in the face of the competitive demands of the current market.

Embodiments of the present disclosure are related to a method for enabling user-customization of a controller design for simulation for purposes of early stage architectural exploration. The method comprises accessing at least one library of individual simulation component models for controller components (e.g. potential sub-components of a memory controller design). The method further comprises receiving information describing an architecture of a customized controller design corresponding to a controller that controls communications between other parts of a target system. In one or more embodiments, the information describing an architecture of the customized controller design includes a description of instances of a subset of the simulation component models in the controller design and connectivity between the instances. The method additionally comprises generating a controller simulation model for the customized controller design based on the first architectural information, the controller simulation model including instances of a plurality of the simulation component models.

In some embodiments, the controller design corresponds to a memory controller configured to interface one or more system on chip components with one or more system memory components. In one or more embodiments, the method further comprises simulating the target system that includes the customized controller design based on the controller simulation model.

In another embodiment, a non-transitory computer readable medium storing instructions for enabling user-customization of a controller design for simulation. The instructions, when executed by a processor, cause the processor to access at least one library of individual simulation component models for memory controller components. The instructions, when executed by a processor, further cause the processor to receive first information describing an architecture of a first memory controller design corresponding to a controller that controls communications between other parts of a target system. In some embodiments, the first architectural specification includes a description of instances of a first plurality of the simulation component models in a first controller design and connectivity between the instances. The instructions when executed by a processor further cause the processor to generate a first controller simulation model for the first customized controller design based on the first architectural information, the controller simulation model including instances of the first plurality of the simulation component models. In some embodiments, the instructions when executed by a processor further cause the processor to simulate the target system that includes the first customized controller design based on the first controller simulation model.

BRIEF DESCRIPTION OF THE DRAWINGS

The teachings of the embodiments disclosed herein can be readily understood by considering the following detailed description in conjunction with the accompanying drawings.

DETAILED DESCRIPTION

The Figures (FIG.) and the following description relate to various embodiments by way of illustration only. It should be noted that from the following discussion, alternative embodiments of the structures and methods disclosed herein will be readily recognized as viable alternatives that may be employed without departing from the principles discussed herein. Reference will now be made in detail to several embodiments, examples of which are illustrated in the accompanying figures. It is noted that wherever practicable similar or like reference numbers may be used in the figures and may indicate similar or like functionality.

Figure 1:
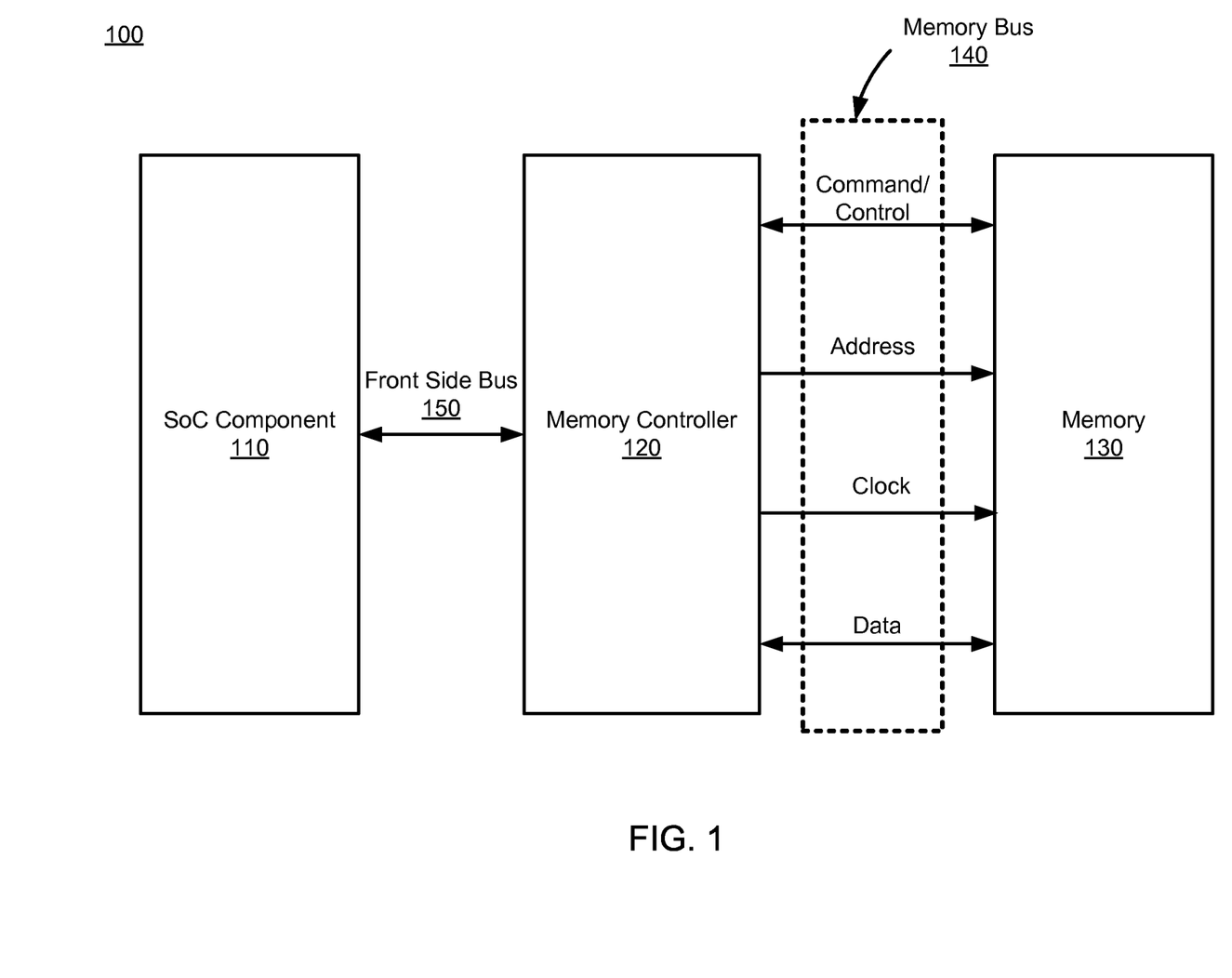
FIG. 1 is a high-level block diagram of a simulated computer system illustrating a memory controller configured to interface with system memory, according to one embodiment.

FIG. 1 is a high-level block diagram of a computing system illustrating a memory controller configured to interface with system memory, according to one embodiment. Computing system 100 may represent a system that is to be modeled and then simulated to verify the behavior of the system. Embodiments herein may also refer to computing system 100 as a target system.

Computing system 100 includes a memory controller 120 that forms an interface between system memory 130 (e.g., a random access memory) and a system on chip (SoC) component 110 (e.g., a Central Processing Unit, Graphics Media Accelerator, Direct Memory Access Module, or the like). As illustrated in FIG. 1, memory controller 120 interfaces with system memory 130 via a memory bus 140 (which includes command, address, data, and clock lines) and with the SoC component 110 via a front side bus 150.

Functionally, the memory controller 120 controls communications between different parts (e.g. SoC component 110 and system memory 130) of a target system. Memory controller 120 manages the flow and timing of data going to a system memory 130 (e.g., write operations to the memory) and data retrieved from a system memory 130 (e.g., read operations from the memory). The memory controller 120 also manages the flow (timing and ordering/sequencing) of command and signaling used to specify the nature of interface (read or write) with the memory 130. The memory controller 120 also manages the flow of address signaling used to specify the portion or location of memory to which data is to be written or from which data is to be read.

Structurally, a memory controller comprises specialized logic and circuitry that interprets commands from the SoC component 110 (e.g., central processing unit) that identify data locations, or addresses, in memory to read from or write to; generates timing and command control information for interfacing with the system memory; and optionally performs inter-port arbitration or inter-channel multiplexing to interface a given memory with one of multiple different SoC components or to interface with multiple different memory buses and memory devices. A memory controller therefore performs a variety of complex memory functions.

Typically writing a system level model for a specific system component like a memory controller requires in-depth knowledge about the architecture and functionality of that component as well as its subcomponents. Different memory controller implementations could have different architectural, functional, and timing characteristics. Embodiments of the present disclosure relate to a modeling technique which can be used to develop generic simulation models for exploring the entire design space for SoC components. More particularly it relates to a configurable memory controller modeling framework which gives capability to the user designer to implement a customized memory controller design implementation from individual component library models.

According to some embodiments, simulation modeling software is provided that allows a user designer to customize a model for a memory controller by selecting the component models for individual hardware components of a memory controller (e.g., from a library of selectable component models), customizing the functionality of individual selected components from the library, designing custom components outside of the preexisting library of component models, selecting attributes of an architectural topology for the memory controller simulation model, and/or specifying placement and interconnectivity of instances of various component models of the memory controller within the architectural topology. The generated memory controller simulation model corresponds to the customized memory controller design for any user-desired memory controller architecture based on the information provided by the user. FIGS. 2-6 are some examples of configurable memory controller simulation models that illustrate different types of configurability options provided to a user designer when generating a customizable memory controller model.

Selection of Components from Library and Configuration of Microarchitecture

Figure 2:
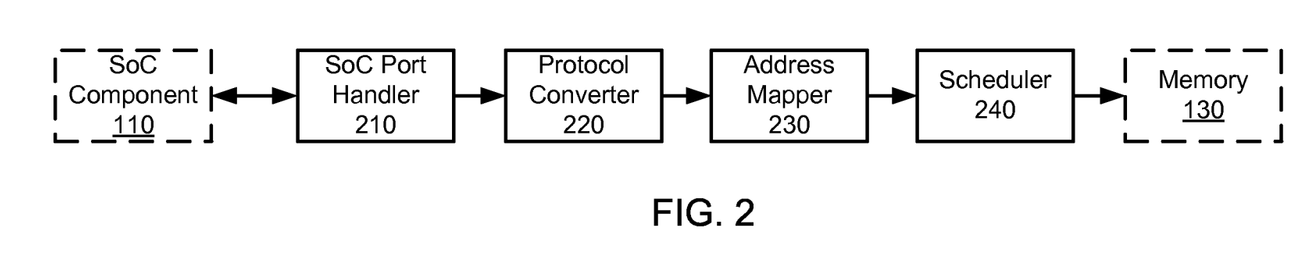
FIG. 2 is a block diagram illustrating a user-customized configuration of a memory controller having a single port and single channel microarchitecture and configured using user-selected components from a component library, according to one embodiment.
Figure 3:
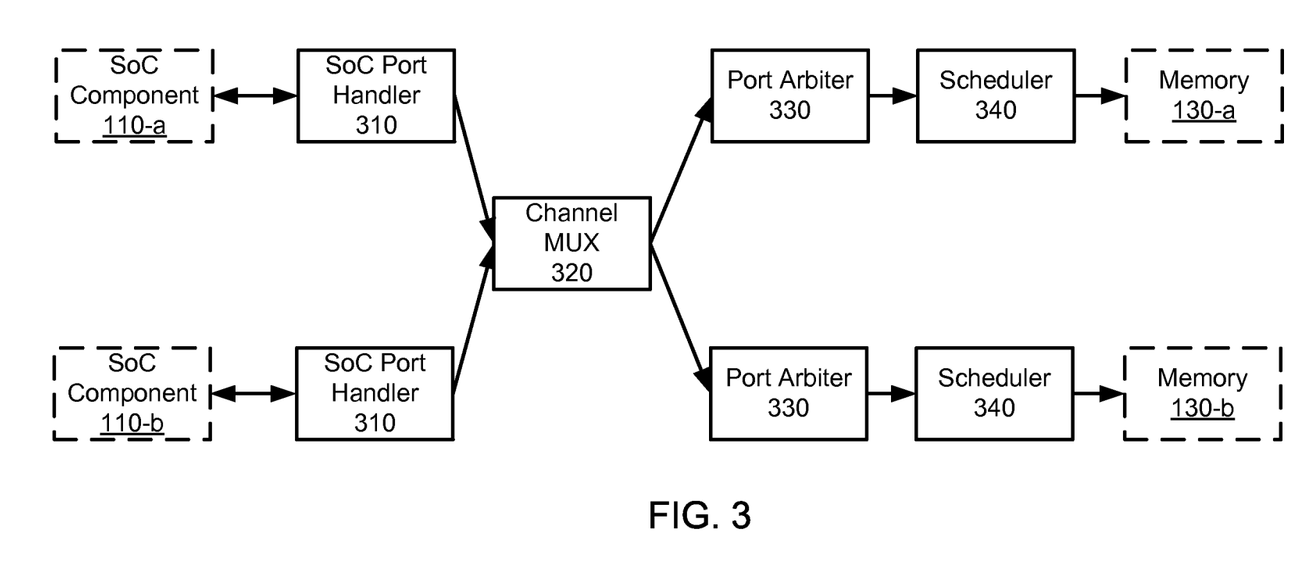
FIG. 3 is a block diagram illustrating a user-customized configuration of a memory controller having a multi-port and multi-channel microarchitecture and configured using user-selected components from a component library, according to one embodiment.

FIGS. 2-3 are examples of memory controller configurations that can be generated from selections of different components from a memory controller component library to generate different microarchitectures of the memory controller simulation model, according to one or more embodiments.

FIG. 2 is a block diagram illustrating a memory controller simulation model for the customized memory controller design having a single port and single channel microarchitecture and configured using user-selected component models from a component library, according to one embodiment. FIG. 2 illustrates a single-ported configuration of a memory controller. The single-ported configuration of FIG. 2 is an example of a single-channel configuration of a memory controller which interfaces with an SoC component 110 (e.g., via SoC port handler 210), acts as a protocol converter (e.g., via protocol converter 220), performs addresses conversion (e.g., via an address mapper 230) and command scheduling/sequencing (e.g., via scheduler 240) for sequencing the commands that are transmitted to the system memory 130. The framework described herein can be used to select individual component models for one or more of these components, specify algorithmic changes that alter functionality for these component models, and modify values of parameters associated with the functionality of these components.

The simulation modeling software may receive an architectural specification for a simulation model that includes a selection of one or more functional classes and, for a selected functional class, a selection of a user-specified component model from among various component models attributed to that functional class. The architectural specification may include a selection of a component model from a functional class based on behavioral or structural attributes that match the user's design needs and goals.

FIG. 3 is a block diagram illustrating a memory controller simulation model for the customized memory controller design having a multi-port and multi-channel microarchitecture and configured using instances of user-selected component models from a component library, according to one embodiment.

The single channel memory controller of FIG. 2 interfaces with a single memory device via a single memory bus. Also, the single channel memory controller of FIG. 2 receives interface commands and data from a single SoC master component. By contrast, and as illustrated in FIG. 3, a memory controller may have a multi-port or multi-channel architecture and be coupled to multiple different SoC components (e.g., memory 110-a and 110-b) and/or multiple different memory components (e.g., memory 130-a and 130-b). The memory controller of FIG. 3 includes a channel multiplexer 320 to multiplex signals between different SoC ports and different memory channels. The memory controller of FIG. 3 also includes a port arbiter 330 for each memory channel, an SoC port handler 310 for each channel, and a scheduler 340 for each channel.

In such embodiments, various different microarchitectures may be simulated through the simulation environment described herein. To generate a simulation model for a memory controller of FIG. 2 or FIG. 3, in some embodiments, a definition for a microarchitectural specification for the memory controller design may be received, including information about a number of instances for each of the first subset of component models, a number of ports of the memory controller, a number of memory controller channels, and the like. A microarchitecture for the simulation model may be generated based on the received specification.

Modifications to Functional Attributes of Selected Library Components

Figure 4:
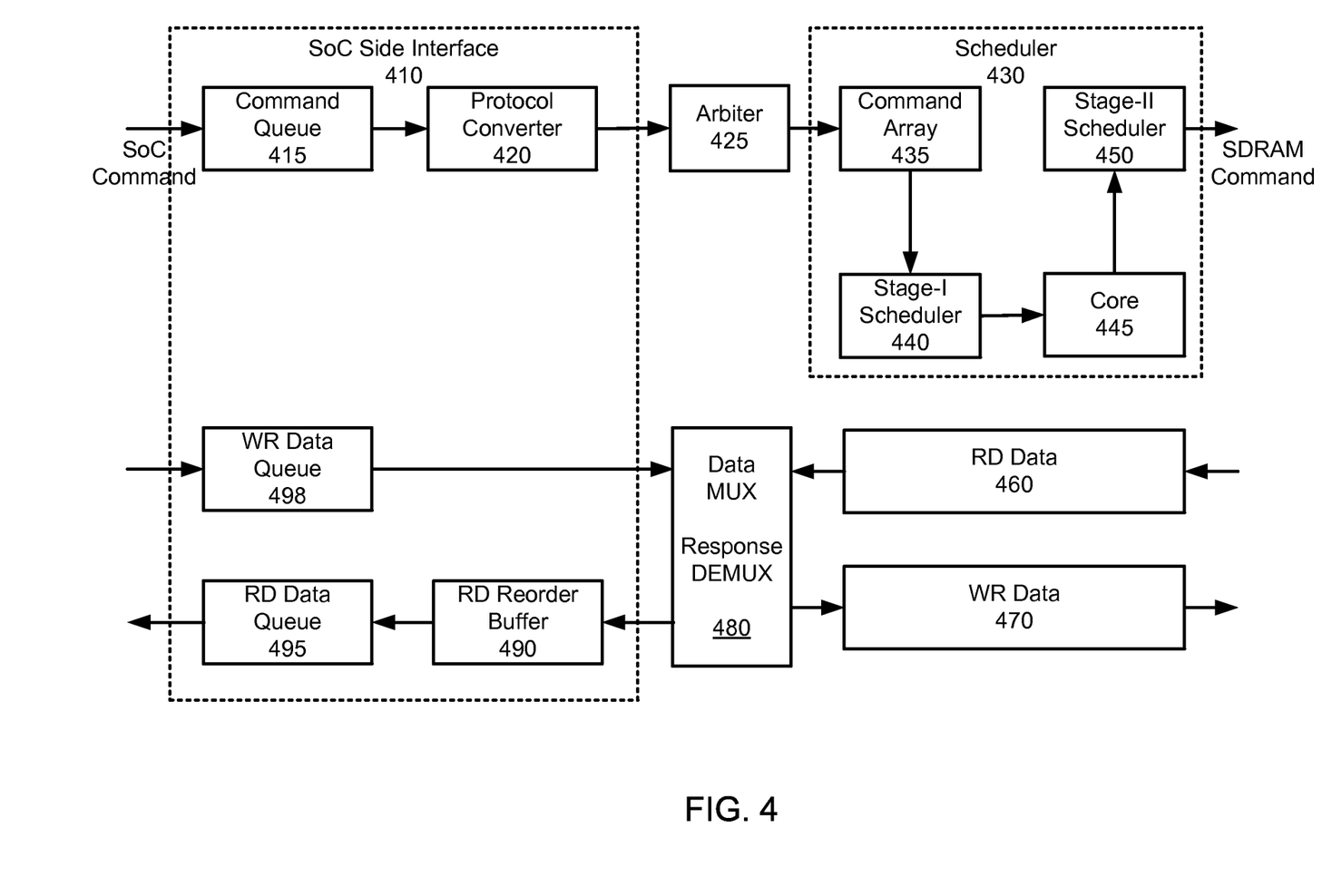
FIG. 4 is a block diagram illustrating a detailed view of components of a user-configurable memory controller that can be selected and modified from selectable components of a component library, according to one embodiment.

FIG. 4 is a block diagram illustrating a detailed view of components of a configurable memory controller simulation model that can be selected and/or modified based on component models provided in a component library, according to one embodiment.

Illustrated in FIG. 4 are components that are selected by a user from a component library to configure a design for a memory controller. For example, the user-selected components in the memory controller design of FIG. 4 include an SoC side interface 410 (e.g., an AXI port interface including a command queue/buffer 415 and a protocol converter 420), a scheduler 430 (e.g., including command scheduling, sequencing, and timing logic; such as a command array 435, stage-I scheduler 440, core 445, and stage-II scheduler 450), and an arbiter 425 (i.e. a channel command selection logic). The memory controller design of FIG. 4 also includes data buffers/queues on the SoC side interface (e.g., WR data queue 498, RD data queue 495, RD reorder buffer 490 and data buffers/queues on the memory side interface (e.g., RD data 460 and WR data 470) and a data multiplexer/demultiplexer 480 (i.e. channel data selection logic).

Typically, these blocks are derived from a common interface class so they can be connected in any order. In one or more embodiments, and as used herein, a common interface class refers to a communication interface (e.g., a OSCI TLM 2.0 and SystemC based communication interface) through which instances of different component models can interact with each other. In such embodiments, the common interface of communication (structural interconnectivity and signal transfer) is configured to be independent of the specific component models that interact with each other. The common interface of communication is therefore useable and interoperable across configurations (structural and placement permutations) of component models of the library. This common interface makes it possible for various component models of the library to be structurally and communicatively connected in different microarchitectural configurations (structural and placement permutations) to realize different controller designs.

Every building block represents a specific memory controller component with specific functionality. The implementation of these blocks is independent of the connected input and output blocks. Different arrangements (e.g., interconnections, alignments) of these building blocks can be implemented to realize different memory controller configurations.

Each component model can have configurable functional behaviors specified by a configurable parameter. For a given selected component model, the simulation modeling software may receive instructions from a user specifying a setting for the configurable parameter. In response, the simulation modeling software uses the user provided setting for the configurable parameter. In one embodiment, the instructions are received through a graphical user interface. In another embodiment, the instructions are received through a configuration file that serves as an architectural description of the controller. For example, if the component design (and simulation) is performed in a batch mode (e.g., iteratively or successively for multiple component designs) the instructions for configuring parameters for component models may be received via a configuration file. On the other hand, if the component design is performed in a user-interactive sequence then the instructions may be received via a graphical user interface through which the user is allowed to provide inputs to guide model creation and simulation.

For example, the simulation modeling software may receive instructions to select a scheduling scheme (order/sequence) for sequencing commands to a system memory, for memory controller scheduler 430. As another example, the simulation modeling software may receive a selection of an arbitration scheme for an arbiter 425. The arbitration scheme selects one of a plurality of requesting ports through which system on chip components interact with one or more memory components. The Arbiter 425 selects one amongst the multiple requesting ports, and grants permission to the selected port to forward a request to an appropriate memory device. Various algorithms could be used for making this decision—for example, a simple priority-based arbitration, a complex Quality Of Service based decision making are examples of such algorithms.

As yet another example, the functional behavior may be a queue depth specifying a capacity of the command queue 415 configured to store commands from a system on chip component. In another case, the simulation modeling software may receive a selection of a clock frequency of a clock signal generated by the clock generation circuit and provided to a system memory component, or a frequency ratio between a first clock signal generated by the clock generation circuit for a system on chip component and a second clock signal generated by the clock generation circuit for a system memory component. The simulation modeling software may also receive a setting for a data width conversion ratio between data exchanged with a system on chip component or data exchanged with a memory component.

More generally, functionality of component models used for generating the memory controller simulation model (such as the various components illustrated in FIG. 4) can be configured or modified; configurations of the SoC component models or system memory component models that the memory controller simulation model interfaces with, can also be configured. As one example, type, organization, and configuration of the system memory (e.g., DDR SDRAM), and number of memory channels can be altered. Choice of memory depends on power and performance requirements as well as cost. Several choices of DDR SDRAM memories may be provided. For a specified memory component, different speed bins, data rates, data widths, and device configurations may be selected. Choice of number of ranks, SDRAM, SDRAM hardware architecture, SDRAM data width, SDRAM burst length etc. also effect memory channel utilization and overall power consumption, and can be configured or modified by the simulation modeling software.

Different implementations, arbitration schemes based on Quality of Service (QOS), port aging or latency, scheduling schemes, logical to physical address conversion, timing constraint between SDRAM commands, reorder schemes, queue depths, frequency ratio between controller and SDRAM, data width and frequency conversion between SoC interface and controller, may also be selected by a user.

The memory controller architecture of FIG. 4 is an example of a complex memory controller architecture—e.g., a multi ported memory controller. But alternative memory controller architectures could be used, such as a single-ported architecture or a multi-channel (e.g., a dual channel or quad channel) architecture; as described with reference to FIGS. 2-3.

Generation of Custom Components Using Templates

Figure 5:
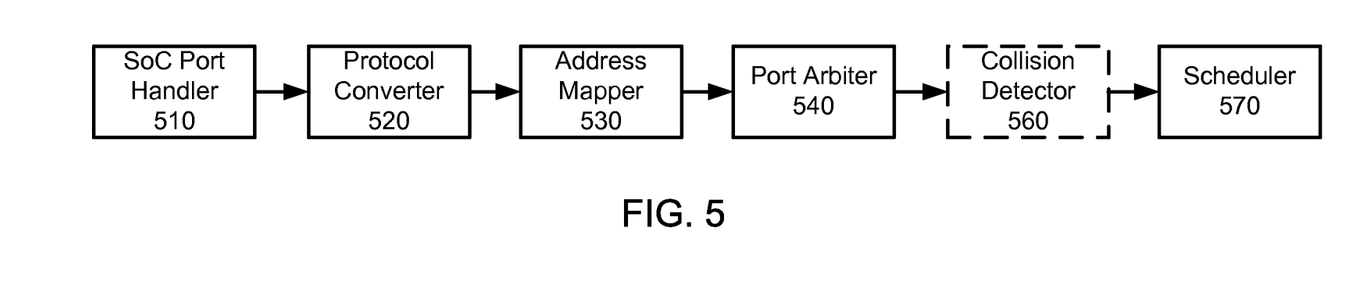
FIG. 5 is a block diagram illustrating components of a user-configurable memory controller including a user-designed custom component, according to one embodiment.

FIG. 5 is a block diagram illustrating components of a configurable memory controller including a user-designed custom component model, according to one embodiment. In such embodiments, a structural description for a model of a custom component is received (e.g., from a user/designer), including a number of incoming and outgoing interfaces to and from the custom component. A template for creation of the custom component model is generated, the template providing a component-design framework in accordance with the received structural description. A functional description for the custom component model is received via the template and an instance of the custom component model is generated.

FIG. 5 includes an illustration of a framework for introduction of a specialized functionality component to the memory controller simulation model, according to one or more embodiments. The framework gives a user the capability to introduce some special functionality component models which may not be present in the available component model library set of the framework. For such additional functionality, the simulation modeling software can generate a custom component model derived from the common interface of component models in the model library and may receive placement information to place an instance of the custom component model within the architectural specification framework of the configurable memory controller simulation model.

Shown in FIG. 5 are various components derived from a component library for designing a memory controller simulation model—for example, SoC port handler 510, protocol converter 520, address mapper 530, port arbiter 540, and scheduler 570. Referring to the example of FIG. 5, in addition to the preexisting components selected from the library, a user may design a collision detector 560 to check for collisions (e.g., command flow conflicts) before a command or transaction is sent to the scheduler 570. Since a collision detector model is not present in the existing library of component models, the user may be provided with the capability to design a custom component model (e.g., a collision detector/checker 560), define the structural and functional attributes of the custom component model, and define the placement of the custom component model in the memory controller simulation model (e.g., between the Arbiter 540 and the Scheduler 570, as shown in FIG. 5).

In one or more embodiments, the simulation modeling software can receive interface information from the user that specifies a number of incoming and outgoing interfaces to be included in the custom interface model. The simulation modeling software then generates a template for the custom component model using the interface information. The template includes the interface implementation of the custom interface model but does not include functionality of the model.

In one or more embodiments, the number of interfaces for a template corresponds to the number of inputs and outputs of a custom component. For example, for a custom channel multiplexer module, a number of input interfaces determines the number of incoming ports and a number of output interfaces determines the number of memory channels to be interfaced with. The simulation modeling software uses information about the incoming and outgoing interfaces to prepare the template for the custom model.

In some embodiments, the template shares common interface properties or model attributes with the preexisting components of the memory controller model library. The use of common interface properties with the remaining components of the model library enables the custom blocks to be compliant with the output and input interfaces of the modeling framework. Since custom blocks are placed in the overall microarchitecture with preexisting library components, the use of a common communication interface (signal flow and structural interconnectivity) enables the custom components to be compatible with the preexisting models. As one example, all library components interact on a TLM 2.0 and SystemC based communication interface and therefore the custom components are also implemented using these communication interfaces. By having common interfaces, the custom block will have the capability to be plugged in at any place in the controller micro architecture. This also enables reuseability and reconfigurability of the custom block with other component model designs. In one embodiment, the template can be a C++ callback on a particular address.

The simulation modeling software provides the template to a user. The user completes the custom model by adding a description of the proper functionality of the custom model into the template. The simulation modeling software then receives the completed custom model from the user.

Figure 6:
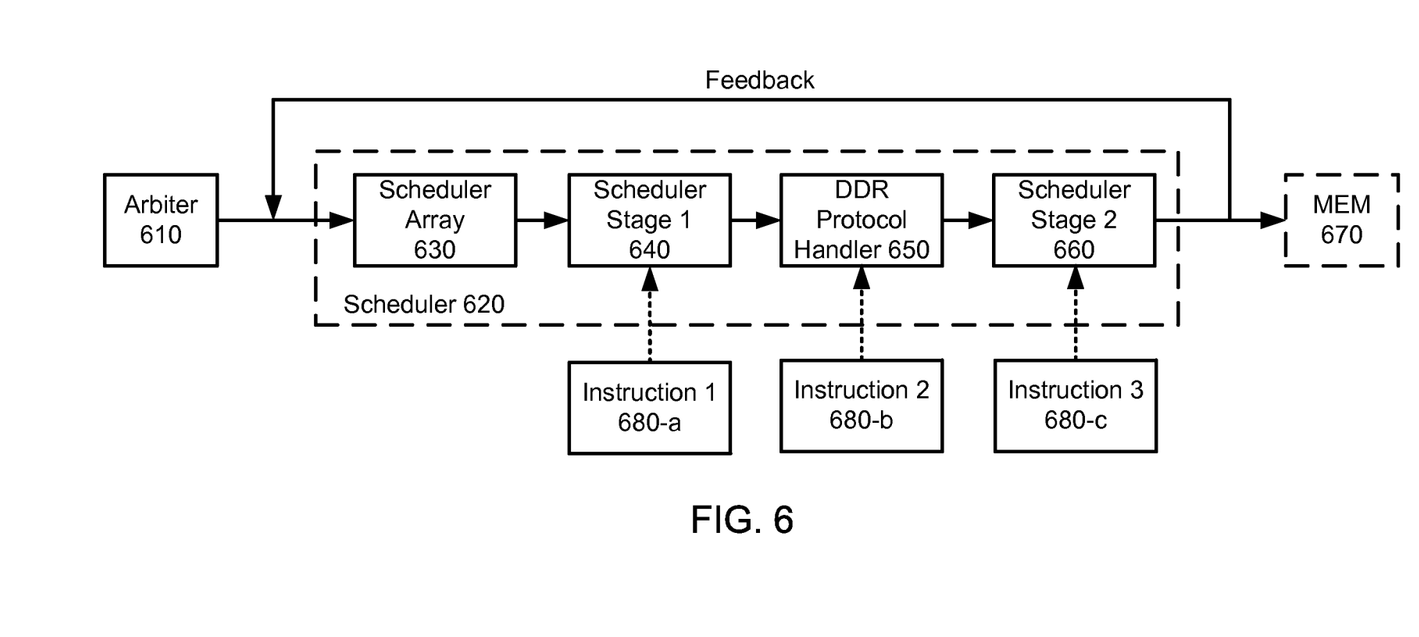
FIG. 6 is a block diagram illustrating components of a user-configurable memory controller with user-customizable functionality, according to one embodiment.

Algorithmic Modifications to Functional Attributes of Selected Library Components FIG. 6 is a block diagram illustrating component models of a memory controller simulation model for the customized memory controller design with customizable functionality, according to one embodiment. FIG. 6 includes an illustration of a framework for modifying a generic implementation of a component model of a memory controller design to realize a user-specified functionality or implement a user-specified algorithm, according to one or more embodiments.

In some embodiments, each component model includes a user definition interface (UDI). Through the UDI the user designer has the capability to define the functionality of existing component models by specifying modifications to instances of existing component models in the component model library, for inclusion into the configurable memory controller simulation model. For example, through the UDI, a user designer is provided the ability to modify a generic implementation of a component model specified in the library, to implement custom (e.g., user-defined) functionality that is distinct from the predefined functionality specified for that model in the library component model. To this end, the user is provided the capability to alter behavior of a component model by making changes to the algorithm that defines the behavior of the model or to values of parameters or variables defined in the functional algorithm that would impact behavior of an instance of the component model in the memory controller design. The simulation modeling software receives these inputs from the user and provides them to the appropriate UDI to make the appropriate changes to instances of the component models.

In one or more embodiments, a UDI is configured to expose a limited set of decision making functions and options to the user without placing excessive cognitive burden on the user of having to decipher, interpret, or modify complex algorithmic functionality (such as interface calls, data structure population, data structure handling, and so on).

In one embodiment, for a given selected component model having a predefined algorithm specifying predefined functional behavior of the selected component model, the simulation modeling software may receive instructions for modifying the predefined functional behavior of instances of the component. In response, the simulation modeling software replaces at least a portion of the predefined algorithm with the received instructions, thus altering the functional behavior of the component instance.

As one example, and as illustrated in FIG. 6, a scheduler 620 may include a two stage scheduler implementation including scheduler stage I 640 and scheduler stage II 660. The scheduling algorithm for the scheduler may be modified, for example, by making changes to the algorithmic implementation of either stage of the scheduler 620 (e.g., scheduler I 640 or scheduler II 660). For instance, the user may provide Instructions 1 and 3, 680-*a* and 680-*c* respectively that are input to the Scheduler Stage I and II component models. Instruction I may include user-defined set of instructions (e.g., choose one command/transaction per bank) and Instruction 3 may include a different set of user-defined instructions (choose one memory transaction/command from all available memory commands).

In such embodiments, the user can define such modifications to scheduler functionality without redefining, modifying, or even reviewing the more complex implementations of Scheduler Array 630 population, Scheduler interface calls, system memory protocol (e.g., JEDEC protocol) handling, and the like. Similarly, the user may modify functional algorithms of instances of the protocol handler component model (e.g., Instruction 2 680-*b* provided to the DDR protocol handler 650 illustrated in FIG. 6) selected for inclusion in the scheduler 620, by providing a set of instructions illustrated in FIG. 6 as Instruction 2 (such as, create a list of pending activate, precharge, and read/write commands) for modifying the operations of the protocol handler 650 illustrated in FIG. 6. Similarly, behavior or configurations of the arbiter 610 or memory 670 may also be modified based on user-provided instructions.

Method Flow

Figure 7:
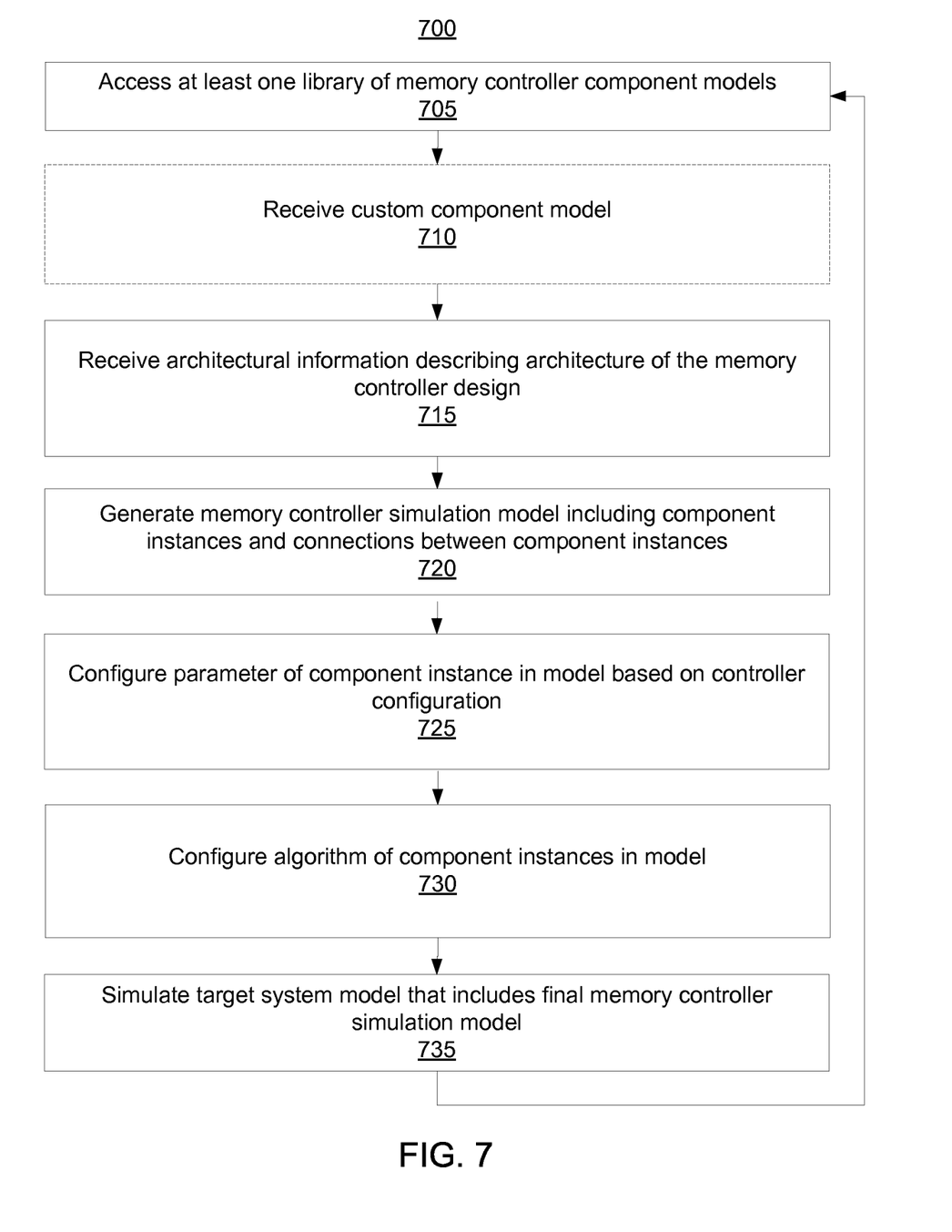
FIGS. 7-8 include flowcharts illustrating customizability of a memory controller architecture, according to one embodiment.
Figure 8:
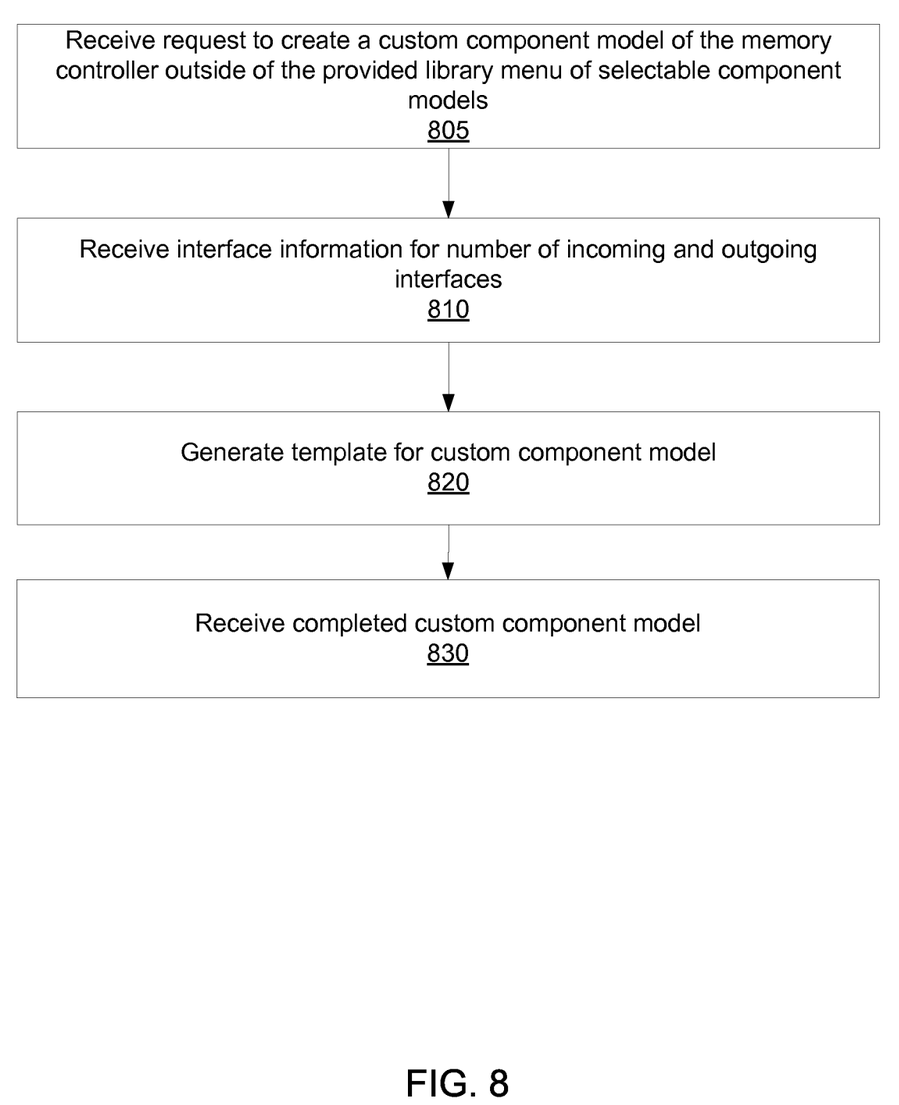

FIGS. 7-8 include flowcharts illustrating customizability of a memory controller simulation model for a memory controller design, according to one embodiment. It should be understood that although various embodiments described herein refer to a memory controller simulation model for a memory controller design, these approaches for providing user-customizability for architectural design exploration can be used for the generation and simulation of other architectural simulation models corresponding to other design environments. For example, these approaches could be used to for any controllers that are responsible for interfacing and communicating between different parts of a target system and may need or benefit from design customization to optimize the communications and performance of the target system.

FIG. 7 illustrates a method 700 for enabling user-customization of a memory controller design for simulation, according to one or more embodiments.

The method comprises accessing 705 at least one library of memory controller components models. The libraries include models for individual components of a memory controller. Each model is a potential building block for a memory controller design, and can be reused across many different memory controller designs. The models can include, for example, port handler models, protocol converter models, arbiter models, and scheduler models.

The method optionally includes receiving 710 a custom component model. In one embodiment, the custom component model may have generated by receiving interface information (e.g., a number of incoming/outgoing interfaces to the component model) and generating a template for creation of the custom component model based on the interface information. The template may be provided to the user designer who completes the template to generate the custom component model. The final custom component model is received from the user.

The method further comprises receiving 715 architectural model information describing a customized memory controller design. The architectural model information describes the structural makeup of and connections within a simulation model of the memory controller design.

In one embodiment, the architectural information can be in the form of an architectural specification. The architectural specification describes a number of instances of a subset of the simulation component models from the library that are to be used in the memory controller simulation model. If custom component models are being used, the architectural specification may also describe a number of instances of the custom component model that are to be used in the memory controller simulation model. The architectural specification also describes a number of incoming and outgoing interfaces that each instance has. The architectural specification further includes connectivity information describing how the interfaces of the instances are connected with each other.

Alternatively, instead of an architectural specification, in some instances, a user interface menu for selecting one or more of a library of selectable memory controller component models may be presented to a user and a selection of a subset of the component models in the menu may be received from the user. In one or more embodiments, the connectivity information between the selected component models is also received via an interactive graphical user interface.

Alternatively, the simulation modeling software may receive information (functional classes, structural attributes, indexing information) which may be used to search through the library to identify an appropriate component model that matches the user-provided information and the identified component model may be selected from the model library.

The method further comprises generating 720 a memory controller simulation model using the architectural specification. The memory controller simulation model includes component instances (based on component models obtained from the library and/or custom component models) and connections between interfaces of the component instances. The memory controller simulation model can appear, for example, similar to the models shown in FIG. 2 or 3.

The method 700 of FIG. 7 further includes configuring 725 one or more parameters of component instances in the memory controller simulation model based on memory controller design configuration. Configuring of the parameters was previously explained by reference to FIG. 4.

The method further comprises configuring 730 an algorithm of component instances in the memory controller simulation model. For example, and as described with reference to FIG. 6, the user may be presented with a user interface (e.g., a UDI described with reference to FIG. 6) for changing a behavioral algorithm of the instance. The method may comprise receiving a user-specified behavioral algorithm and modifying the instance based on the user-specified behavioral algorithm.

The method further comprises simulating 735 a target system model that includes the final memory controller model. The target system model includes the final memory controller model as well as models for other components (e.g. CPU, memory) of the target system.

The process may repeat multiple times and re-use the memory controller component models for different memory controller designs. For instance, additional distinct memory controller simulation models for distinct memory controller designs can be generated based on different architectural specifications and different subsets of model components selected from the model library.

FIG. 8 illustrates a method of creating a custom component instance for inclusion in the memory controller simulation model, according to one or more embodiments.

The method comprises receiving 805 a request to create a custom component model of the memory controller. The custom component model is a model that is outside of (i.e. not included in) the provided library of component models. The method further comprises receiving 810 interface information specifying a number of incoming and outgoing interfaces of the custom model model. The method additionally comprises generating 820 a template for the custom component model using the interface information and providing the template to a user, such as outputting the template to a file. The user generates the custom component model by adding a description of the model functionality to the template. The method also comprises receiving 830 from the user the completed custom component model. The creation of a custom component model is explained further with reference to FIG. 5.

Figure 9:
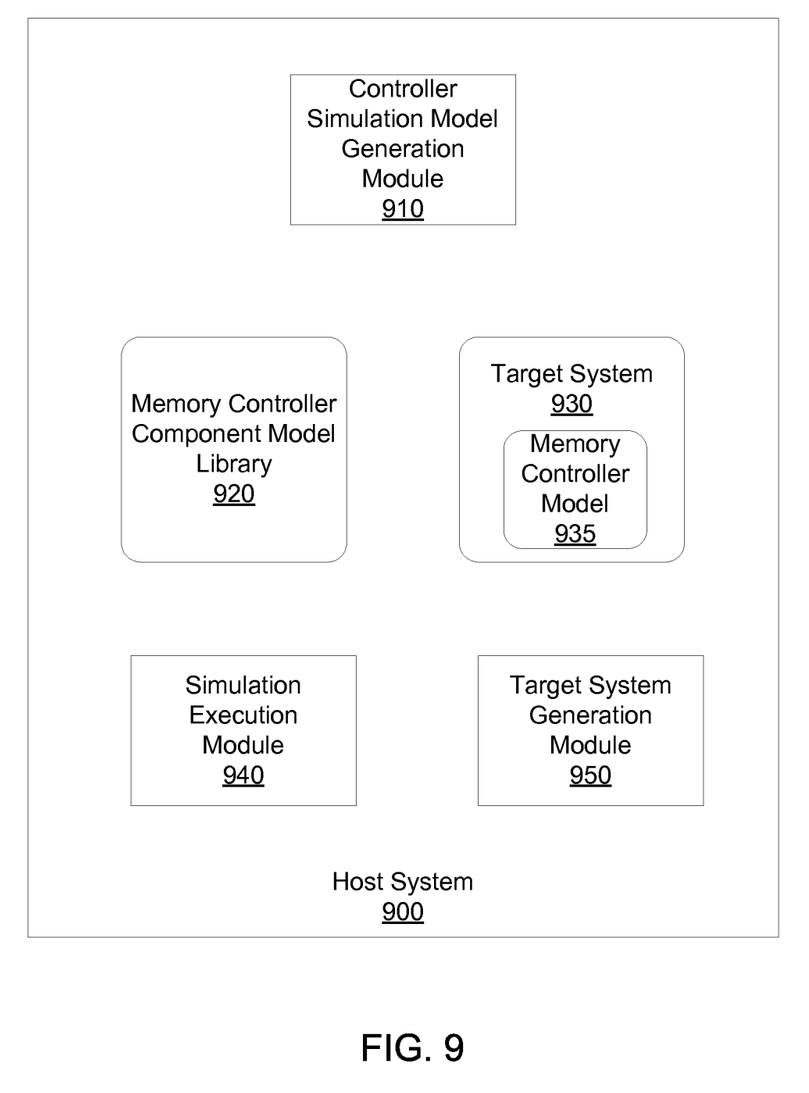
FIG. 9 illustrates a system diagram of a simulation system environment for the generation of the memory controller simulation model and the simulation of a target system having the generated simulation model, according to one or more embodiments.

FIG. 9 illustrates a system diagram of a simulation system environment for the generation of the memory controller simulation model and the simulation of a target system having the generated simulation model, according to one or more embodiments.

Host system 900 corresponds to a computing device (e.g., including a processor, memory, and optionally coupled to peripheral devices) on which simulation is executed. The host system 900 includes a memory controller simulation model generation module 910, a memory controller component model library 920, a target system 930, a simulation execution module 940, and a target system generator module 950.

Simulation model generation module 910 performs one or more of the steps of method 700 described with reference to FIGS. 7-8 for enabling user-customization of a memory controller design for simulation and generating/preparing the target system model. Specifically, the simulation model generation module 910 generates a user customizable memory controller model 935 from a select subset of memory controller models stored in the memory controller component model library 920.

The memory controller component model library 920 includes individual simulation component models for memory controller components, such as component models for the various components described with reference to FIGS. 2-6 (e.g., commands queues, data queues, SoC side interfaces, protocol converters, data multiplexers/demultiplexers, arbiters, schedulers, and the like). In one embodiment, the component models may be SystemC compliant component models. In some embodiments there can be more than one library 920. The libraries are also stored across one or more non-transitory computer readable mediums (e.g. disk drives).

Target system 930 corresponds to a system to be tested during simulation. In some embodiments, the target system 930 includes a component model for a system on chip component (e.g., corresponding to SoC component 110 of FIG. 1), a memory controller model 935 (e.g., corresponding to memory controller 120 of FIG. 1), system memory model (e.g., corresponding to system memory 130 of FIG. 1), and software instructions to execute on the model. The memory controller model 935 includes instances of memory controller component models from the library 920, and may also include instances of custom components as described herein.

Target system generation module 950 generates the target system 930 for simulation. The target system generation module 950 may obtain the memory controller model 935 from the controller simulation generation module 910. The target system generation module 950 may load pre-built models for other parts of the target system 930, such as the system memory and SoC components (e.g. processor core, graphics media accelerators, etc). In other embodiments the target system generation module 950 may generate those models from individual components using the techniques described herein. The target system then connects the models together to form the target system 930.

Simulation execution module 940 simulates the target system 930 that includes the memory controller model 935 once the appropriate simulation models are prepared. In one embodiment, the simulation execution module 940 is a SystemC simulation kernel that executes a SystemC simulation of the target system 930.

In one embodiment the modules described herein are implemented as executable instructions stored on one or more non-transitory computer readable media. The instructions are executable by at least one processor to perform the simulation modeling operations described herein.

Upon reading this disclosure, those of skill in the art will appreciate still additional alternative designs for a modeling frameworks for designing a memory controller. Thus, while particular embodiments and applications of the present disclosure have been illustrated and described, it is to be understood that the embodiments are not limited to the precise construction and components disclosed herein and that various modifications, changes and variations which will be apparent to those skilled in the art may be made in the arrangement, operation and details of the method and apparatus of the present disclosure disclosed herein without departing from the spirit and scope of the disclosure as defined in the appended claims.

What is claimed is:

1. A non-transitory computer readable medium storing instructions for enabling user-customization of a controller design for simulation, the instructions when executed by a processor cause the processor to:
   access at least one library of simulation component models for controller components;
   receive an instance of a custom controller component model, the custom controller component model representing a controller component that has yet to be implemented in hardware, wherein the instructions for receiving the instance of the custom controller component model further cause the processor to:
      receive interface information describing a number of incoming and outgoing interfaces to and from the custom controller component model,
      generate a template for creation of the custom controller component model based on the received interface information, and
      receive the custom controller component model, the custom controller component model being user generated via the template;
   receive first information comprising logic operations corresponding to early stage exploration of an architecture of a first customized controller design corresponding to a controller that controls communications between other parts of a target system; and
   generate a first controller simulation model for the first customized controller design based on the first information describing the architecture of the first customized controller design, the first controller simulation model including instances of a plurality of the simulation component models and the instance of the custom controller component model.

2. The computer readable storage medium of claim 1, wherein the customized controller design corresponds to a memory controller configured to interface one or more system on chip components with one or more system memory components.

3. The computer readable storage medium of claim 1, wherein the first information includes an identification of the instances of the plurality of the simulation component models in a first controller design and a description of connectivity between the instances.

4. The computer readable storage medium of claim 1, further comprising instructions that, when executed, cause the processor to simulate the target system that includes the first customized controller design based on the first controller simulation model.

5. The computer readable storage medium of claim 1, further comprising instructions that, when executed, cause the processor to:
   receive second information comprising logic operations corresponding to early stage exploration of an architecture of a second customized controller design corresponding to the controller that controls communications between other parts of the first target system, the controller design has yet to be implemented in hardware; and
   generate a second controller simulation model for the second controller design based on the second information describing the architecture of the second controller design, the second controller simulation modeling including instances of at least some of the plurality of the simulation component models.

6. The computer readable storage medium of claim 1, wherein the custom controller component model is not part of the at least one library of simulation component models.

7. The computer readable storage medium of claim 1, further comprising instructions that when executed by a processor, cause the processor to:
   for a given instance of a given component model having a predefined algorithm specifying predefined functional behavior of the selected component model, receive instructions for modifying the predefined algorithm; and
   replace at least a portion of the predefined algorithm in response to the received instructions.

8. The computer readable storage medium of claim 1, further comprising instructions that when executed by a processor, cause the processor to:
   for a given instance of a given component model having a configurable functional behavior specified by a configurable parameter, receive instructions for setting the configurable parameter; and
   set the configurable parameter in response to the instructions.

9. The computer readable storage medium of claim 8, wherein the given component model corresponds to a memory controller scheduler and the configurable parameter is a scheduling scheme for sequencing commands to a system memory.

10. The computer readable storage medium of claim 8, wherein the given component model corresponds to a memory controller port arbiter and the configurable parameter is an arbitration scheme for selecting one of a plurality of requesting ports to be given permission to interface with a memory component.

11. The computer readable storage medium of claim 8, wherein the given component model corresponds to a command queue configured to store commands in a memory controller from a system on chip component and the configurable parameter is a queue depth specifying a capacity of the command queue.

12. The computer readable storage medium of claim 8, wherein the given component model corresponds to a memory controller clock generation circuit and the configurable parameter is a clock frequency of a clock signal generated by the clock generation circuit and provided to a system memory component.

13. The computer readable storage medium of claim 8, wherein the given component model corresponds to a memory controller clock generation circuit and the configurable parameter is a frequency ratio between a first clock signal generated by the clock generation circuit for a system on chip component and a second clock signal generated by the clock generation circuit for a system memory component.

14. The computer readable storage medium of claim 8, wherein the given component model corresponds to a memory controller data width conversion circuit and the configurable parameter corresponds to a data width conversion ratio between data exchanged by a memory controller with a system on chip component or data exchanged by the memory controller with a memory component.

15. The computer readable storage medium of claim 1, wherein the information corresponding to early stage exploration of an architecture further describes a number of incoming and outgoing interfaces for each instance and the connectivity information describes connectivity between the instances.

16. A computer implemented method for enabling user-customization of a memory controller design for simulation, the method comprising:
  accessing at least one library of individual simulation component models for memory controller components;
  receiving an instance of a custom controller component model, the custom controller component model representing a controller component that has yet to be implemented in hardware, wherein receiving the instance of the custom controller component model further comprises:
    receiving interface information describing a number of incoming and outgoing interfaces to and from the custom controller component model,
    generating a template for creation of the custom controller component model based on the received interface information, and
    receiving the custom controller component model, the custom controller component model being user generated via the template;
  receiving first information comprising logic operations corresponding to early stage exploration of an architecture of a first customized controller design corresponding to a controller that controls communications between other parts of a first target system; and
  generating a first controller simulation model for the first customized controller design based on the first architectural information, the first controller simulation model including instances of a first plurality of the simulation component models and the instance of the custom controller component model.

17. The method of claim 16, further comprising:
  receiving second information comprising logic operations corresponding to early stage exploration of an architecture of a second customized controller design corresponding to the controller that controls communications between the other parts of the first target system, the controller design has yet to be implemented in hardware; and
  generating a second controller simulation model for the second controller design based on the second information describing the architecture of the second controller design, the second controller simulation modeling including instances of at least some of the plurality of the simulation component models.

18. The method of claim 17, further comprising:
  for a given instance of a given component model having a predefined algorithm specifying predefined functional behavior of the selected component model, receiving instructions for modifying the predefined algorithm; and
  replacing at least a portion of the predefined algorithm in response to the received instructions.

19. The method of claim 16, wherein the custom memory controller component model is not part of the at least one library of simulation component models.

* * * * *